US008490163B1

(12) United States Patent
Harsell et al.

(10) Patent No.: US 8,490,163 B1
(45) Date of Patent: Jul. 16, 2013

(54) ENFORCING SECURITY POLICIES ACROSS HETEROGENEOUS SYSTEMS

(75) Inventors: Dan Harsell, Menlo Park, CA (US); Jeff Armbrecht, Palo Alto, CA (US)

(73) Assignee: IntApp, Inc., Palo Alto, CA (US)

( * ) Notice: Subject to any disclaimer, the term of this patent is extended or adjusted under 35 U.S.C. 154(b) by 1053 days.

(21) Appl. No.: 11/530,447

(22) Filed: Sep. 8, 2006

(51) Int. Cl.
*G06F 7/04* (2006.01)
*G06F 9/00* (2006.01)

(52) U.S. Cl.
USPC .................................. 726/6; 726/12

(58) Field of Classification Search
USPC ....................................... 726/6, 12
See application file for complete search history.

(56) References Cited

U.S. PATENT DOCUMENTS

| | | | | |
|---|---|---|---|---|
| 6,484,261 | B1 * | 11/2002 | Wiegel | 726/11 |
| 6,789,202 | B1 * | 9/2004 | Ko et al. | 726/23 |
| 2005/0091068 | A1 * | 4/2005 | Ramamoorthy et al. | 705/1 |
| 2005/0160361 | A1 * | 7/2005 | Young | 715/513 |

OTHER PUBLICATIONS

Wikipedia.com, Active Directory, http://en.wikipedia.org/wiki/Active_directory, [online], [Retrieved on Sep. 17, 2007, Last Modified on Sep. 12, 2007], Retrieved from the Internet URL: http://en.wikipedia.org/wiki/Active_directory.
Wikipedia.com, Lightweight Directory Access Protocol, http://en.wikipedia.org/wiki/Lightweight_Directory_Access_Protocol, [online], [Retrieved on Sep. 17, 2007, Last Modified on Sep. 17, 2007], Retrieved from the Internet URL: http://en.wikipedia.org/wiki/Lightweight_Directory_Access_Protocol.
Wikipedia.com, Computer Security, http://en.wikipedia.org/wiki/Computer_security [online], [Retrieved on Sep. 17, 2007, Last Modified on Sep. 17, 2007], Retrieved from the Internet URL: http://en.wikipedia.org/wiki/Computer_security.
Wikipedia.com, http://en.wikipedia.org/wiki/Access_control_list [online], [Retrieved on Sep. 17, 2007, Last Modified on Aug. 1, 2007], Retrieved from the Internet URL: http://en.wikipedia.org/wiki/Access_control_list.
Wikipedia.com, http://en.wikipedia.org/wiki/Role-based_access_control [online], [Retrieved on Sep. 17, 2007, Last Modified on Sep. 10, 2007], Retrieved from the Internet URL: http://en.wikipedia.org/wiki/Role-based_access_control.
Wikipedia.com, http://en.wikipedia.org/wiki/Capability-based_security [online], [Retrieved on Sep. 17, 2007, Last Modified on Aug. 27, 2007], Retrieved from the Internet URL: http://en.wikipedia.org/wiki/Capability-based_security.
Dev2Dev.com, http://e-docs.bea.com/wles/docs42/adminguide/administration.html [Retrieved on Sep. 17, 2007], Retrieved from the Internet URL: http://e-docs.bea.com/wles/docs42/adminguide/administration.html.

* cited by examiner

*Primary Examiner* — Michael S McNally
*Assistant Examiner* — Daniel Hoang
(74) *Attorney, Agent, or Firm* — Fenwick & West LLP

(57) ABSTRACT

A system, method, and computer program product enforce a universal security policy across several systems. In one embodiment, the system comprises a translation module that translates the universal security policy into local security rules enforceable by the security components of the several systems. The system also comprises a policy pushing module that transmits the translated local security rules to each of the several systems. Further, the system can include an analysis module for detecting local security rules in the several systems that are inconsistent with the universal security policy.

18 Claims, 4 Drawing Sheets

ENFORCING SECURITY POLICIES ACROSS HETEROGENEOUS SYSTEMS

BACKGROUND OF THE INVENTION

1. Field of the Invention

This invention pertains in general to data communications and processing and in particular to enforcing security policies in heterogeneous systems.

2. Description of the Related Art

As computers and networks proliferate, and become more powerful and affordable, a growing number of enterprises are using them both to perform critical tasks and manage sensitive information. However, the convenience provided by computers and networks is leading to easy access to confidential information. Often, confidential information is distributed among multiple enterprise computer systems (e.g., a document management system, an email system, a web server). The proliferation of the confidential information across multiple systems creates a security risk because it increases the number of people that can access the information.

This easy access to confidential information is problematic because there are many reasons why an enterprise might wish to restrict access to the information. For example, the enterprise might need to enforce ethical screens in order to prevent conflicts of interest. Likewise, the enterprise might desire to restrict certain information, such as financial data, to only people that need to access it. Because the information subject to restriction can be distributed in several systems, the access restriction needs to be enforced universally in order to be effective.

One approach to enforcing a universal security policy across multiple systems is to manually configure the security component of each system to enforce the universal security policy. For example, the administrators need to configure one set of local security rules for a document management system, a different set of rules for an email system, and another set for a directory service. The local security rules for different systems can be different, even if they reflect the same universal security policy. Because each of the security components is tailored to work for a specific system, any update of the universal security policy would cause the administrators to reconfigure the security component of each system, thereby increasing the risk of human errors. Also, because the universal security policy needs to be enforced across all systems within the organization, as the complexity of the universal security policy grows, manual configuration becomes impractical.

Alternatively, some applications try to enforce a universal security policy across multiple systems by installing a module in each of the multiple systems. The module enforces the universal security policy by filtering the traffic of the associated system and blocking those that violate the universal security policy. This approach slows down the network traffic and causes the performance of the systems to suffer. Also, this approach is inefficient because the modules do not utilize the security component provided by the associated system, which tends to be more efficient because it is integrated into the system. Further, the information within an entity is ever changing: employees and customers come and go, and emails and documents are created and modified constantly. Unless the universal security policy is updated to reflect the changes and enforced by each of the modules in real time, people may improperly access unauthorized information.

Therefore, there is a need in the art for a way to enforce a security policy across multiple systems.

BRIEF SUMMARY OF THE INVENTION

The above need is met by a system, method, and computer program product for enforcing a universal security policy across multiple systems within an enterprise network. In one embodiment, the system comprises a translation module that translates the universal security policy into local security rules enforceable by the security components of the multiple systems. The system also comprises a policy pushing module that transmits the translated local security rules to each of the multiple systems. Further, the system can include an analysis module for detecting local security rules in the multiple systems that are inconsistent with the universal security policy.

In another embodiment, the method retrieves identity information of the users and resources from the multiple systems, defines the universal security policy based on the identity information, translates the universal security policy into local security rules enforceable by one of the multiple system, and transmits the translated local security rules to the corresponding system so that the associated security component can enforce them.

In yet another embodiment, the method identifies local security rules enforced by one of the multiple systems that are not consistent with the universal security policy and replaces them with local security rules that are consistent with the universal security policy.

In still another embodiment, the method detects user actions, modifies the universal security policy based on the detected user actions, translates the modified universal security policy into local security rules enforceable by a system, and transmits the translated local security rules to the corresponding system so that the associated security component can enforce them.

One advantage of the disclosed embodiments of the invention is the scope of the protection provided. Because the method ensures that each system within the enterprise network receives enforceable local security rules equivalent to a universal security policy, the universal security policy is enforced across the enterprise network. The disclosed method is also more efficient than the conventional solutions because it leverages the capabilities of the security components of each individual system in the enterprise network to enforce the universal security policy. Further, the disclosed system is flexible and robust because it monitors user behaviors and local security rules changes and adjusts the universal security policy accordingly in real time.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Overview

Figure 1:
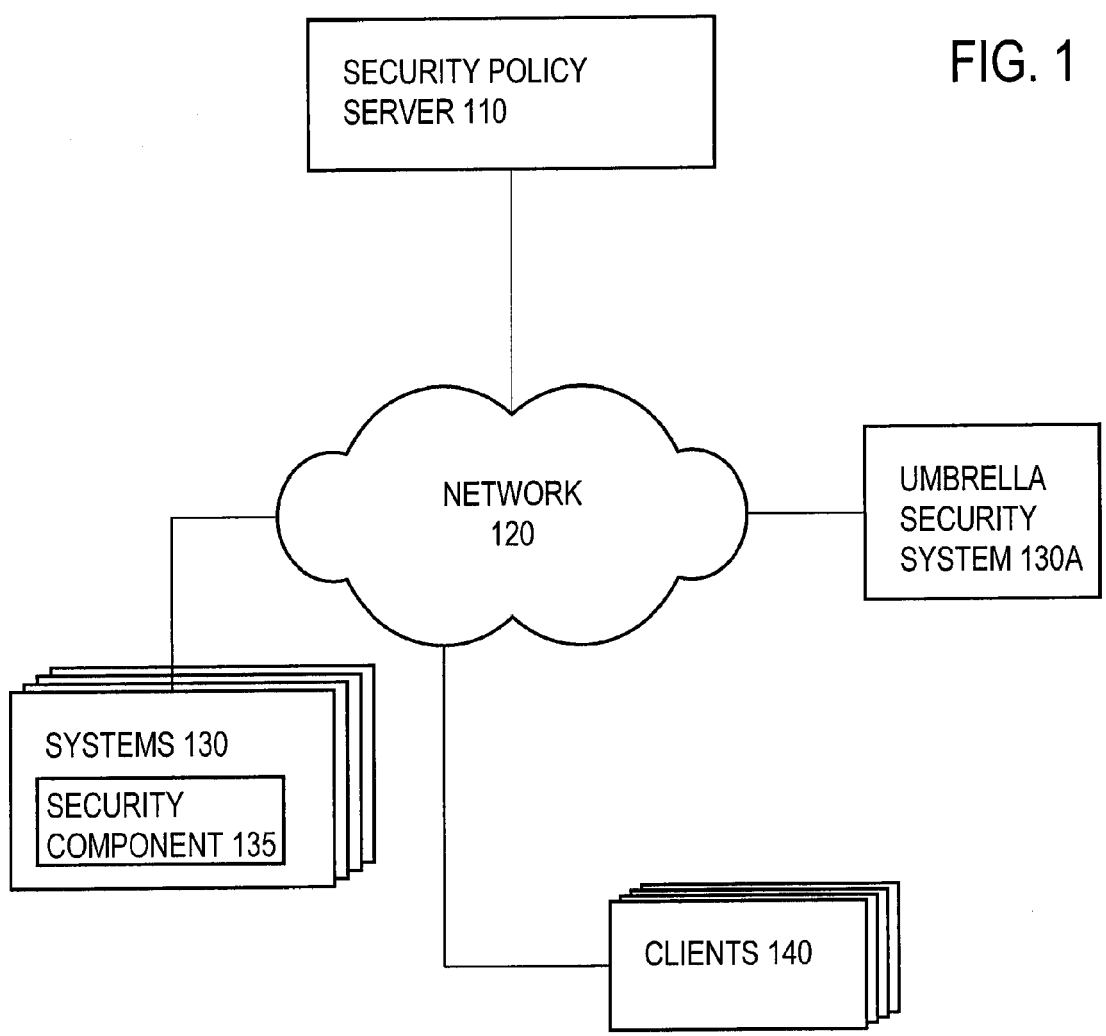
FIG. 1 is a high-level block diagram of a computing environment for enforcing a universal security policy across multiple systems according to one embodiment of the present invention.

FIG. 1 is a high-level block diagram of a computing environment 100 for enforcing a universal security policy across multiple systems according to one embodiment of the present invention. FIG. 1 illustrates a security policy server ("server") 110, multiple client computers ("clients") 140, and multiple data management systems ("systems") 130, all connected to a network 120. The systems 130 comprise an umbrella security system 130A.

The security policy server 110 is a hardware and/or software device that maintains and enforces the universal security policy across several systems 130. In one embodiment, the server 110 enforces the universal security policy within an enterprise. The enterprise can be any organization created for one or more goals (e.g., a company, a partnership, a government agency, etc.). The server 110 includes functionality for creating and maintaining the universal security policy. For example, the server 110 includes an interface for administrators to manage the policies and optionally another interface for importing policies from external sources. For each of the multiple systems 130, the security policy server 110 converts (or translates) the universal security policy into local security rules that can be enforced by the system 130 and transmits the local security rules to the system 130 through the network 120. Each of the multiple systems 130 applies the received local security rules during its operation; thereby collectively preventing violations of the universal security policy across the multiple systems 130.

A universal security policy is a set of universal security rules that regulate how an enterprise manages, protects, and distributes its resources. The resources can include the enterprise's clients (parties having business relationship with the enterprise), matters (topics of which the enterprise organizes its works, e.g., a lawsuit), network devices (e.g., PDA, personal computer), and sensitive information (e.g., computer files containing confidential information). The security policy can be applied to either a single system 130 or many systems 130 within the enterprise. The universal security rules can define which entity (e.g., a user, a group of users) has access to which resource(s). In addition, the rules can define one or more conflicts among resources. A conflict between two resources means that the two resources (e.g., confidential information) cannot be accessed by the same entity.

In one embodiment, the resources and entities involved in a conflict are separated into groups, with resources and entities associated with the same side of the conflict in the same group. As an example, a conflict may separate some entities (e.g., users or groups of users) and resources (e.g., documents, devices, clients) into two groups: a collection of documents together with a group of users in one group, and a different group of users and a collection of network printers in the other group. The relationship between two groups can be exclusive, inclusive, or unrelated. The entities of a group can access the resources located within the same group or groups that are inclusive to the group, but not the resources located in groups that are exclusive to the group. The entities of a group can access the resources located in groups that are unrelated to the group, unless prohibited by other rules. Entities and resources on different sides of a conflict are included in mutually exclusive groups. A security rule can also restrict the privileges an entity has over the resources located in a group (e.g., no one who accessed a resource in Group A can access any resources in Group B). There is no restriction on the number of groups an entity or resource can be included in.

One exemplary universal security policy is a universal security policy designed to enforce an ethical wall within a law firm. An ethical wall (also known as "ethical screen") refers to restricting communications in a law firm or other enterprise in order to prevent communications that would violate the ethical obligations of the enterprise. For example, a law firm may be approached to represent a new client in a matter that is adverse to a former client. An ethical wall can be used to ensure that no information known to the law firm due to its representation with the former client is improperly utilized during the representation of the new client.

In one embodiment, the security policy server 110 can maintain multiple universal security policies, and can enforce one or more of the multiple universal security policies at any given time. For example, the server 110 can enforce one universal security policy for one set of resources, and enforce another universal security policy for another set of resources.

A data management system 130 is a hardware and/or software device for managing a set of structured data, and running operations on the data requested by entities such as the end-users. Typical examples of systems 130 include accounting information systems (e.g., Intuit QuickBooks), human resource management systems (e.g., Oracle Human Resource Management System), document management systems (e.g., Hummingbird DOCS Open, Rational ClearCase), and directory services (e.g., Microsoft Active Directory). The systems 130 may also include mail systems (e.g., Microsoft Exchange Server), web servers (e.g., Apache HTTP Server), customer relationship management systems (e.g., mySAP CRM), and the like.

Each of the systems 130 includes a security component 135 that provides security management functionalities for the data under control of the system 130. For example, the document management system Hummingbird DOCS Open has a security component 135 that enforces local security rules to prohibit certain entities (e.g., users and groups of users) from accessing and/or modifying certain documents. The security components 135 of the different systems 130 vary in many aspects. For example, some security components 135 allow only administrators to set local security rules, while others permit users to set and/or modify local security rules to grant their rights to others. Some security components 135 presume that no entity has any rights to any resources, and administrators can create local security rules to grant entities such rights, while others presume that all entities have all rights to all resources, and use local security rules to restrict such rights. Some security components 135 accept entity-based rules (e.g., describing what resources can be accessed by an entity), while others accept resource-based rules (e.g., describing what entities can access a resource). Therefore, different security components 135 do not necessarily accept the same local security rules. Also, even if two security components 135 accept the same local security rules, they may interpret them differently, causing the results to vary. Therefore, in order for the systems 130 to enforce the same universal security policy, the server 110 translates the universal security policy into local security rules tailored for each of the systems 130 and transmit the translated local security rules to the corresponding systems 130.

An umbrella security system 130A is a data management system 130 that acts as the security authority for some of the systems 130 (hereinafter called "subsidiary systems"). In some embodiments, the computing environment 100 includes one or more umbrella security systems 130A. The server 110 translates the universal security policy into local security rules tailored for the umbrella security systems 130A. The umbrella security systems 130A, in turn, enforce the local security rules on the set of subsidiary systems under their control. A Microsoft Active Directory server is an example of an umbrella system.

The client computers 140 represent the computer systems operable by users to access the systems 130 within the computing environment 100. An example of a client 140 is a personal computer connected to the network 120. The client 140 can have one or more operating systems such as Microsoft Windows, LINUX, and/or a variant of UNIX.

The network 120 represents the communication pathways between the server 110, the systems 130, and the clients 140. In one embodiment, the network 120 is a private enterprise network. In another embodiment, the network 120 is the Internet or includes portions of the Internet. In one embodiment, the network 120 carries traffic using standard communications technologies and/or protocols. Thus, the network 120 can include links using technologies such as Ethernet, 802.11, integrated services digital network (ISDN), digital subscriber line (DSL), asynchronous transfer mode (ATM), etc. Similarly, the networking protocols used by traffic on the network 120 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
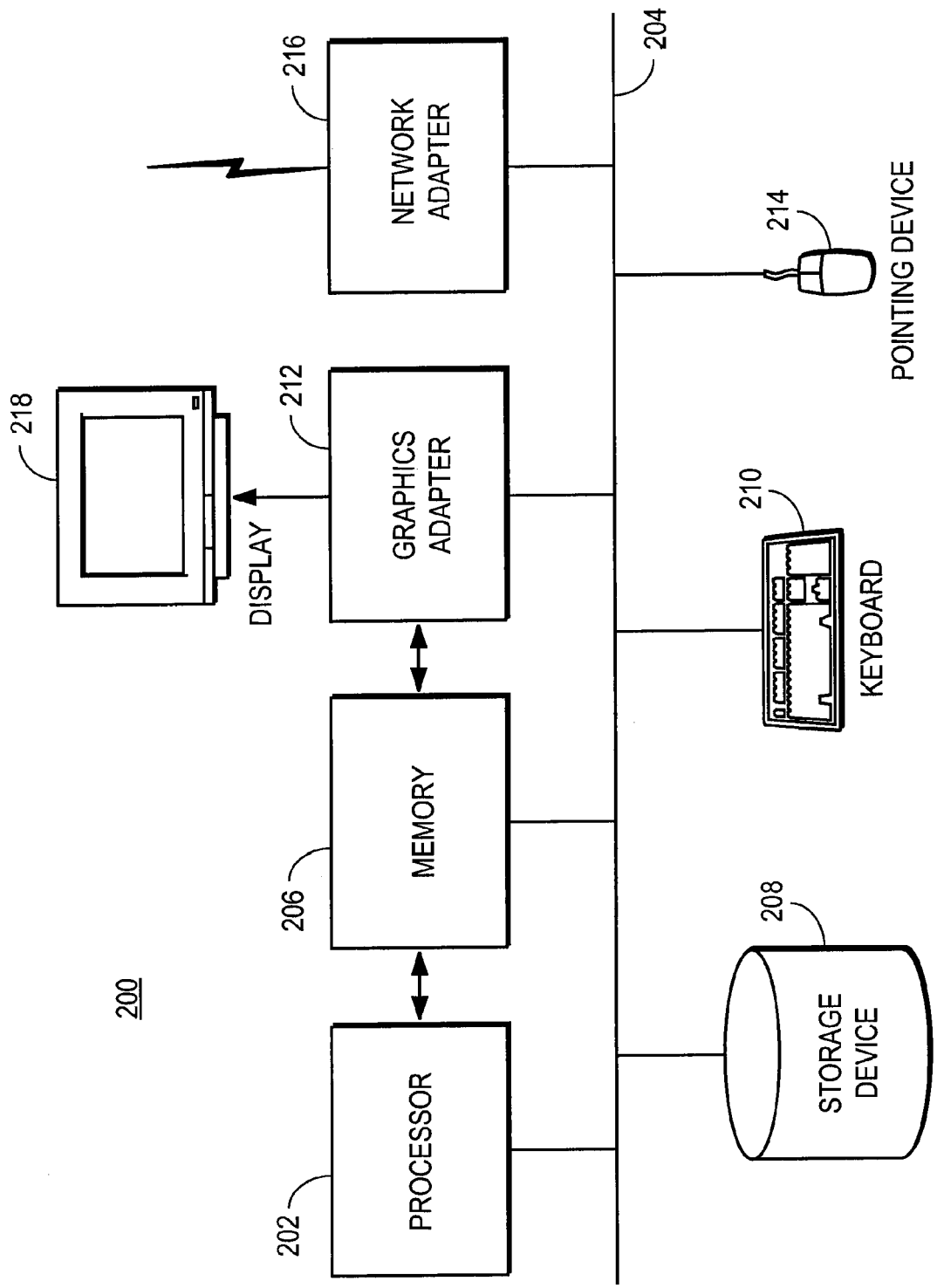
FIG. 2 is a high-level block diagram illustrating a functional view of a computer for use as one of the entities illustrated in the environment of FIG. 1 according to one embodiment.

FIG. 2 is a high-level block diagram illustrating a functional view of a computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the network 120. In many instances the computer lacks one or more of the elements shown in FIG. 2, such as a keyboard 210, pointing device 214, graphics adaptor 212, and/or display 218.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required by the entity. A client 140 might be a single computer 200. Each of the systems 130, in contrast, might be provided by a server running on a more powerful computer and/or one or more blade servers operating in tandem. Likewise, in one embodiment the security policy server 110 comprises one or more modules executing on one or more blade servers or other types of computers working together to provide the functionality described herein.

Figure 3:
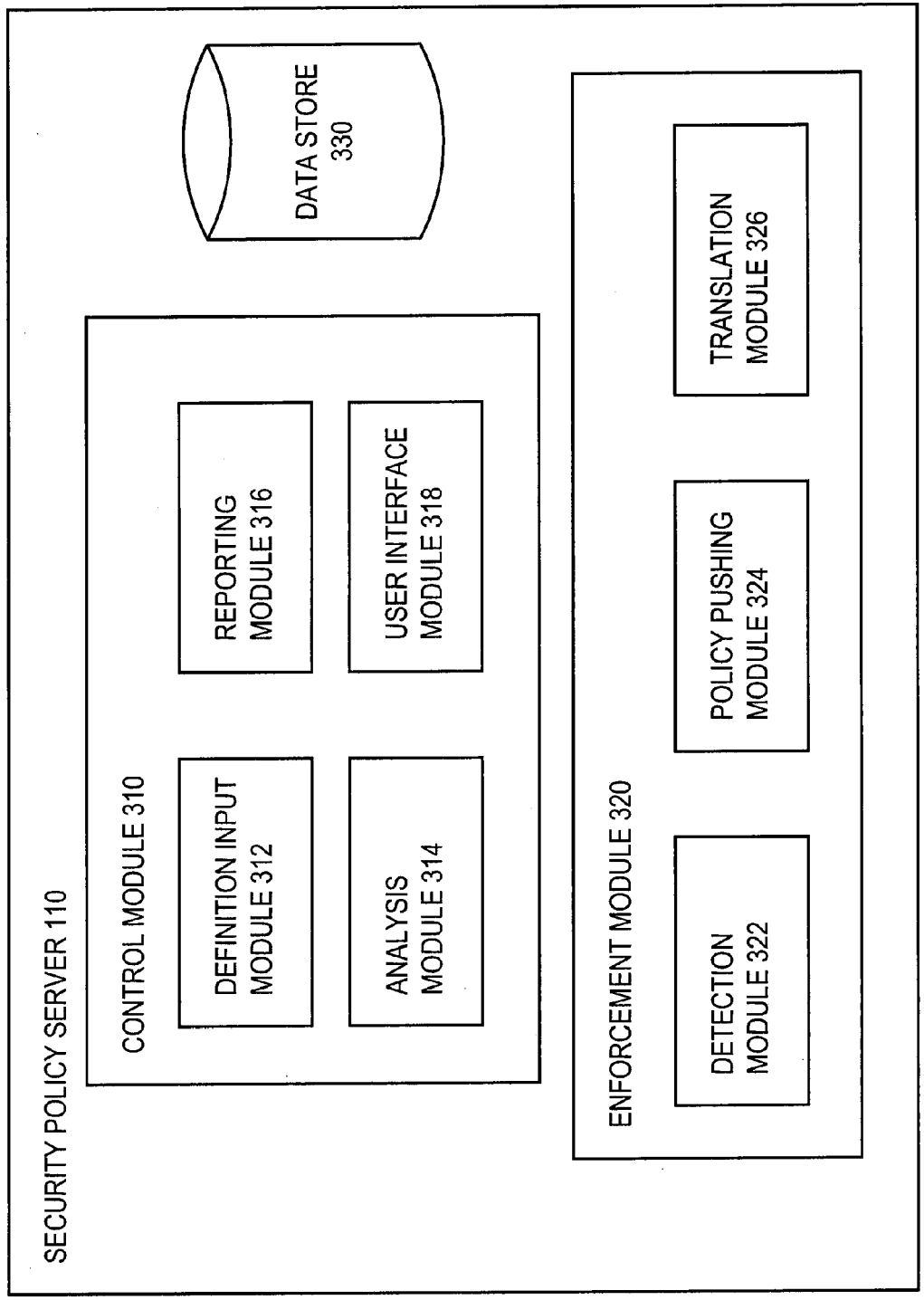
FIG. 3 is a high-level block diagram illustrating modules within a security policy server illustrated in the environment of FIG. 1 according to one embodiment.

FIG. 3 is a high-level block diagram illustrating modules within the security policy server 110 according to one embodiment. Other embodiments have additional and/or different modules than the ones shown in the figure. In addition, the functionalities can be distributed among the modules in a manner different than described here. Further, some of the functions can be provided by entities other than the security policy server 110. As illustrated in FIG. 3, the server 110 includes a control module 310, an enforcement module 320, and a data store 330.

The control module 310 allows authorized users to manage the universal security policy for the computing environment 100. The control module 310 includes a definition input module 312, an analysis module 314, a reporting module 316, and a user interface module 318.

The definition input module 312 is configured to import and/or export the universal security policy from and/or to external sources. In one embodiment, the definition input module 312 is configured to periodically backup the universal security policy by exporting it to external sources (e.g., a USB drive) and later restore the policy by importing it as needed (e.g., when the policy became corrupted). Alternatively, the definition input module 312 can import the universal security policy from another computer environment 100, such that the administrators can customize the imported policy to be enforced by the server 110, instead of creating it from scratch. For example, the definition input module 312 can use the Lightweight Directory Access Protocol (LDAP) to query the security policy of another enterprise network stored in a directory service such as the Microsoft Active Directory.

The analysis module 314 is configured to analyze the integrity of the universal security policy. For example, the analysis module 314 can examine a set of candidating universal security rules to be added to the universal security policy to determine whether they are consistent with the universal security policy. For example, assuming the universal security rule prohibits an attorney from accessing a client document, while a candidating universal security rule grants the attorney such access, the analysis module 314 would determine that there is inconsistency. If the analysis module 314 determines that there is inconsistency, the server 110 can choose not to enforce these candidating universal security rules (e.g., by not adding the candidating rules to the universal security policy) and to request the reporting module 316 to report the inconsistency to the relevant users.

The reporting module 316 is configured to notify users of security policy relevant information. Such notices can be sent to the intended audience in different format, such as emails, voice messages, radio broadcast, pop-up messages, and mobile phone/pager text messages. For example, the server 110 can periodically check each systems 130 for security violations, retrieve information describing the violations, identify the universal security rule corresponding to the violated local security rule (through the translation module 326 as is further described herein), and request the reporting module 316 to send notice to those users involved in the violation. The notice can contain content that educates the users of the universal security rules they breached, identify the user actions that violated the universal security rules, and shows ways to prevent such violations in the future. For example, a user in one group that attempts to access confidential information or other resources in another group exclusive to the first group can receive a pop-up message from the reporting module 316 that explains why the access is prohibited (e.g., the user belongs to a group that is prohibited from accessing documents related to a certain matter). The reporting module 316 can be configured to track security related information and maintain a record of such information that can be retrieved by the administrators. For example, the reporting module 316 can send a daily summary of securities violations within the enterprise to a designated user.

The user interface module 318 is configured to provide an interface for the authorized personnel (e.g., the security administrators) to configure the server 110 and manage the universal security policy. The interface can be graphical user interface, command-line interface, or web-based user interface. The authorized personnel can use the interface to set up and control modules such as the modules 312, 314, 316, and 320, manage the data store 330, and create or modify the universal security policy (e.g., creating, editing, or deleting universal security rules).

The authorized personnel can also use the interface to view and manage the universal security policy. As the universal security policy evolves, its collection of universal security rules can become large and complex. The user interface module 318 can provide users with features assisting them to manage the universal security rules. For example, the user interface module 318 can display all universal security rules and groups of entities and resources. The user interface module 318 can display universal security rules relevant to entities, resources, or groups as specified by the users. The user interface module 318 can also display entities and resources affected by a given universal security rule. Alternatively, the authorized personnel can use the interface to configure the format, content, and intended audience of the notifications to be sent out by the reporting module 316. Users of clients 140 can access the user interface module 318 remotely through the network 120.

The data store 330 is configured to store the universal security policy (e.g., security rules and their corresponding descriptions) and related information (e.g., information about users and resources and their relationships). The information about the users and resources can include information such as user identity (e.g., login name, email alias, employment number, social security number, etc.), client identity (e.g., client name, client number, client billing account number), device identity (e.g., printer name, scanner network address, MAC address, etc.), and electronic content identity (e.g., file/directory name, document identifier, database table identifier). The relationships information can include information such as the collection of different user identities that are associated with the same user and the association of a sensitive file and the identity of its related client(s). The data store 330 can also be configured to store information about the systems 130 and the clients 140. Examples of such information includes the identity of a system 130, the resources contained in the system 130, the format of security rules that are enforceable in the system 130, and a collection of the local security rules that is currently enforced in the system 130. The data store 330 can also store the record of security related information and contents of notices for the reporting module 316. In one embodiment, the structured information database 112 is a relational database that supports queries made in the structured query language (SQL). Other embodiments utilize different types of databases.

The enforcement module 320 is designed to enforce the universal security policy across the systems 130 in the computing environment 100. The enforcement module 320 includes a detection module 322, a policy pushing module 324, and a translation module 326.

The translation module 326 is configured to translate the universal security rules into local security rules enforceable by the different systems 130 in the computing environment 100. In one embodiment, the translation module 326 performs the translation based on the translating instructions stored in the data store 330.

Different systems 130 describe security policy differently. For example, a mail system uses local security rules that are based on email alias to describe security policy, while a document management system uses local security rules that are based on user login names and document identifiers. Different systems 130 may also accept local security rules in different formats. For example, one system 130 may accept local security rules in XML format, while another may only accept rules in plain text, and yet another system may accept rules in a proprietary format. For each of the systems 130, the translation module 326 translates the universal security rules into local security rules in a format acceptable by the system 130. One global security rule may be translated into multiple local security rules. For example, a universal security rule defining a conflict between two groups can be translated into multiple local security rules for a document management system, each prohibiting a user of one group from accessing a resource of the other group.

The translation module 326 can be configured to actively check the universal security policy for updates. Once the translation module 326 detects an update, it can retrieve the modified universal security policy and translate it into local security rules.

In one embodiment, the translation module 326 can also translate the local security rules of a system 130 into equivalent universal security rules that can be enforced by the server 110. Therefore, the server 110 can retrieve the local security rules of a system 130 (through the detection module 322 as is further described herein), translate the retrieved local security rules into equivalent universal security rules, integrate the translated universal security rules into the universal security policy, and enforce the integrated universal security policy across the systems 130.

The policy pushing module 324 is configured to transmit the translated local security rules to the corresponding system 130, so that the system 130 can enforce the translated local security rules. Together with the translation module 326, the policy pushing module 324 enables the different systems 130 to enforce the universal security policy.

Different systems 130 accept local security rules in different manners. For example, some systems 130 accept security rules by receiving a computer file containing the security rules in a certain format (e.g., XML); some systems accept security rules through their Application Program Interfaces (API); while others only accept security rules encrypted using the keys they provide. The policy pushing module 326 transmits the local security rules to the corresponding system 130 in the manner compatible with the system 130.

The detection module 322 detects information about the systems 130 and the clients 140. The information about a system 130 can include identification information (e.g., name and manufacture of the system 130), security information (e.g., acceptable security rule format, manner of setting/retrieving local security rules), and content information (e.g., resources stored in the system 130). Depending on the nature of the system 130, the content information includes file names and file identifiers (document management system), email aliases (mail system), client identifiers (customer relationship management system, billing system), and the like. The information about a client 140 can include user information (e.g., login time) and user activity information (e.g., access history to the systems 130). The detection module 322 can detect such information directly from the systems 130 and the clients 140. Alternatively, the detection module 322 can retrieve the information from other sources, such as a directory service of the computing environment 100. The detection module 322 can store the detected information in the data store 330. In one embodiment, the detection module 322 derives translating instructions based on the retrieved information about the acceptable security rule format and stores the derived translating instructions in the data store 330 for use by the translation module 326.

The detection module 322 can also be configured to identify and retrieve the local security rules of the systems 130. In one embodiment, the detection module 322 requests the translation module 326 to translate the retrieved local security rules into equivalent universal security rules, and sends the translated universal security rules to the analysis module 312 to determine whether they are consistent with the universal security policy. If there is inconsistency, the server 110 can invalidate the conflicting local security rules by requesting that the system 130 delete or invalidate them (e.g., transmitting consistent local security rules to the system 130 to overwrite the conflicting rules).

The detection module 322 can be configured to detect user activities and update the universal security policy when needed. The detection module 322 can periodically query the data management systems 130 and the client computers 140 for user activities. The user activities include information such as the identification information of the user (e.g., login name), the time of the activity, and the description of the activity (e.g., accessed a document). Certain user activities can have consequences affecting the universal security policy. For example, one user's activity of accessing one resource indicates that the user cannot access resources that conflict with the resource accessed. The detection module 322 can send the detected user activities to the analysis module 312 to determine whether they have any impact on the universal security policy. If they are determined to have impacts on the universal security policy, the server 110 can modify the universal security policy accordingly (e.g., inserting the user who conducted the activity into a group).

In one embodiment, the data store 330 stores a copy of the enforced local security rules for each of the systems 130. The server 110 can periodically retrieve the local security rules of the systems 130, identify changes by comparing with the local security rules previously stored in the data store 330, and determine whether the modified local security rules are consistent with the universal security policy. If the modified local security rules are determined to be inconsistent with the universal security policy, the server 110 can rollback the changes and restore the local security rules according to the local rules previously stored in the data store 330 and notify the relevant users (e.g., those users who modified the local security rules, administrators, and other parties) of the rollback. Otherwise, the server 110 can update the local security rules stored in the data store 330 to reflect the changes. The server 110 can also modify the universal security policy to include the modification, and transmit translated local security rules to all systems 130 so that the modified security rules are enforced in all systems 130. Because the server 110 can keep the local security rules consistent with the universal security policy without human intervention, the systems 130 appear to self-heal from changes made to the local security rules that are inconsistent with the universal security policy.

III. Process/Example

Figure 4:
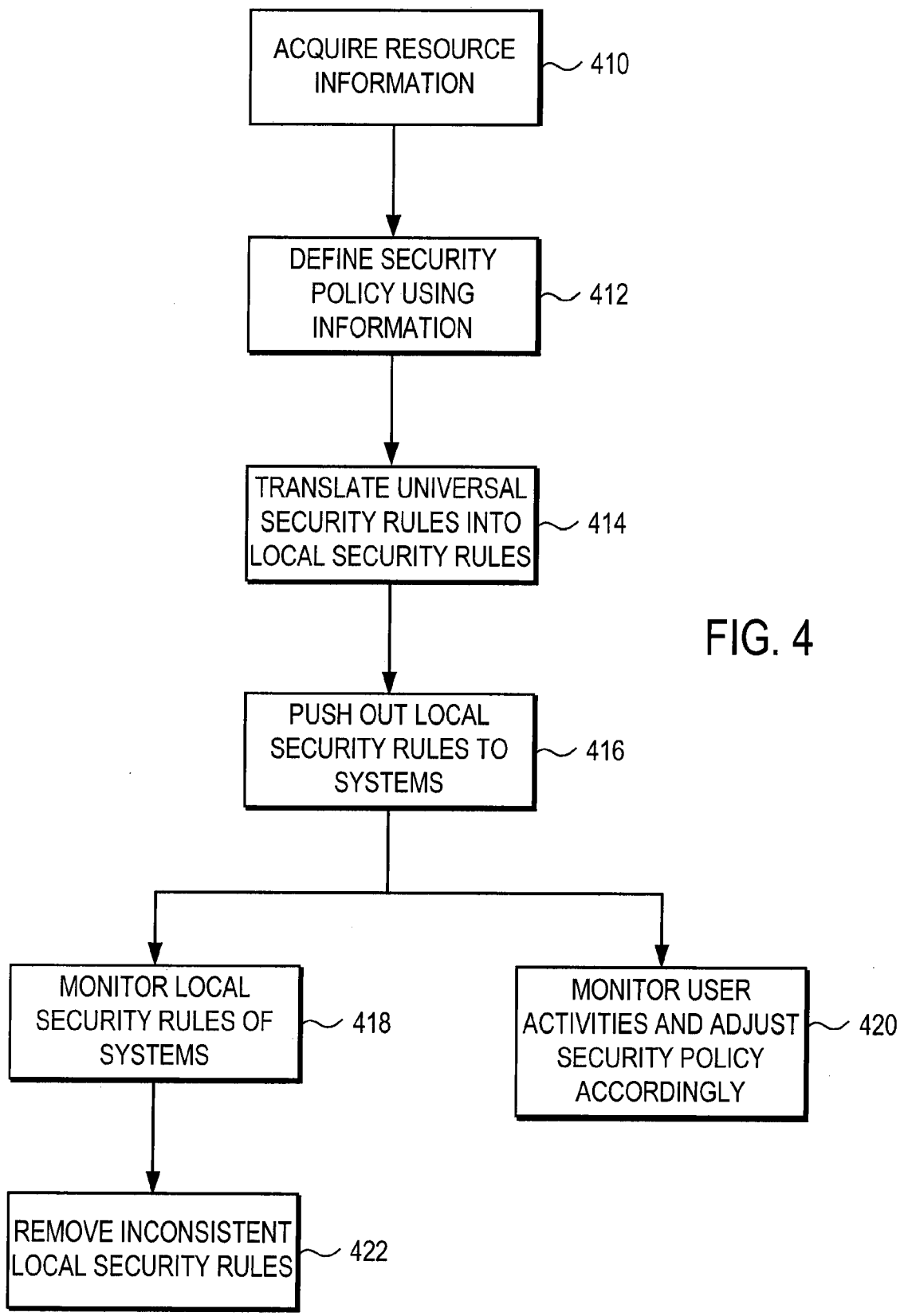
FIG. 4 is a flow chart illustrating steps performed by the security policy server to enforce a universal security policy across multiple systems according to one embodiment.

FIG. 4 is a flow chart illustrating steps performed by the security policy server 110 to enforce a universal security policy across multiple systems according to one embodiment. Other embodiments perform the steps in different orders and/or perform different or additional steps than the ones shown in FIG. 4. The server 110 can perform multiple instances of the steps of FIG. 4 concurrently and/or perform steps in parallel.

Initially, the detection module 322 of the security policy server 110 acquires 410 resource information about the systems 130. The resource information includes identity information about the systems 130. For example, identity information about a document management system can include brand information (e.g., Hummingbird DM), version information (e.g., version 2003, build 11.2359.2408), network address information (e.g., IP address 139.247.30.178), and so on. The resource information also includes local security information about the systems 130. For example, the local security information of a document management system can include information about the manner to retrieve/set security rules of the system (e.g., information about the API to set security rules), information about the format of the security rules of the system (e.g., in one format the user identifier is placed before the corresponding privilege, while in another the user identifier is placed after the privilege), and the local security rules. The resource information also includes identification information of the resources in the systems 130. Examples of the identification information can include information such as user identity, client identity, device identity, electronic content identity, and their relationships (e.g., the login name, email alias, social security number, and the employment number that are associated with the same user). The resource information can also include information about whether a system 130 is an umbrella security system 130A, and information identifying the subsidiary systems controlled by the umbrella security system 130A. As described in FIG. 3 with regard to the detection module 322, the detection module 322 can also derive translating instructions based on the acquired information.

The detection module 322 can acquire 410 the resource information from the systems 130. Alternatively, the detection module 322 can retrieve such information from other places such as a directory service storing information about the systems 130 (e.g., Microsoft Active Directory). The resource information can also be provided by the authorized personnel through the user interface module 318.

The server 110 defines 412 the universal security policy using the resource information acquired in step 410 and the user input through the user interface module 318. The universal security policy comprises universal security rules. Each universal security rule defines some restrictions for users to access certain resources within the computing environment 100. In one embodiment, the universal security rules are translated from the local security rules of one or more systems 130.

The translation module 326 of the server 110 translates 414 the universal security rules into local security rules enforceable by each of the systems 130. As described in FIG. 3 with regard to the translation module 326, each system 130 may accept local security rules in different formats. Therefore, the server 110 needs to translate the universal security rules into local security rules before pushing the local security rules to the systems 130. For example, for a universal security rule establishing an ethical wall between two resources, the translation module 326 may need to translate it into several local security rules for a document management system: some rules for establishing a group for entities (e.g., users or groups of users) accessing the same resource, and other rules for prohibiting the group of entities accessing one resource from accessing the other resource. For a mail server, the translation module 326 may need to translate the universal security rule into rules such as not forwarding an email about a resource to entities having access to the conflicting resources.

The policy pushing module 324 of the server 110 pushes (or transmits) 416 the translated local security rules to the systems 130 through the network 120. As described in FIG. 3 with regard to the policy pushing module 324, the policy pushing module 324 conducts the pushing in a manner compatible with the systems 130. After pushing the local security rules into the systems 130, the universal security policy is enforced by the security component 135 of each system 130. As discussed with regard to FIG. 1, in one embodiment the local security rules are pushed to an umbrella security system 130A that in turn enforces security on a set of subsidiary systems. Therefore, the server 110 needs not to translate 414 and push 416 local security rules to the subsidiary systems.

The detection module 322 of the server 110 monitors 418 the local security rules of the systems 130 for modifications (e.g., addition, deletion, replacement of local security rules). The modifications of the local security rules can be caused by users or the systems 130 themselves. For example, a user with administrator privileges may modify the local security rules of a system 130 to grant another user access to a particular file. The user being granted the access can be a member of a group that is prohibited from accessing the file by the universal security policy. Therefore, such local security rule modifications can conflict the universal security policy. The system 110 can retrieve the recently added or modified local security rules and determine whether they are consistent with the universal security policy.

The analysis module 314 of the server 110 removes 422 the modified local security rules if they are determined to be inconsistent with the universal security policy. The analysis module 314 can overwrite the modified local security rules by pushing local security rules that are consistent with the universal security policy to the system 130. In one embodiment, if the analysis module 314 determines that the modified local security rules are consistent with the universal security policy, the server 110 can be configured to translate the modified local security rules into equivalent universal security rules and add the translated universal security rules into the policy and push to the other systems 130, such that the systems 130 within the computing environment 100 can enforce a security policy that is universal and consistent.

The detection module 322 of the server 110 monitors 420 user activities and adjusts the universal security policy accordingly. As described in FIG. 3 with regard to the detection module 322, user activities can indicate changes of relationships among the users and resources. These changes need to be reflected in the universal security policy to keep its integrity. For example, assuming an attorney formerly not representing either of two conflicting clients (e.g., representing one client while knowing confidential information of the other client would detrimentally affect the other client) billed time to one of the two clients, this shows that the attorney is now representing the client billed, and should no longer have access to the confidential information of the other client. Therefore, the server 110 should update the relevant universal security rules to prohibit the attorney from accessing the confidential information of the other client, and push the new rules to the systems 130. Another user activity having similar effects is the addition of the attorney to a mailing list associated with one of the two conflicting clients. By monitoring the user activities and updating the universal security policy accordingly, the server 110 can keep the universal security policy consistent and up-to-date.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for enforcing a universal security policy across a plurality of data management systems, the universal security policy comprising a plurality of universal security rules describing relationships among users and resources, each of the plurality of data management systems having a security component for enforcing local security rules in the associated data management system, comprising:

receiving information about the security components of the plurality of data management systems;

for each of the plurality of data management systems:

translating at least one of the universal security rules into local security rules based on the received information, the local security rules being compatible with the security component of the data management system, the local security rules being equivalent to the at least one of the universal security rules, and transmitting the local security rules to the data management system, wherein the security component of the data management system enforces the local security rules in the data management system to restrict users from accessing resources available in the data management system;

monitoring, by a computer, user activities occurring in the plurality of data management systems;

responsive to a determination that an activity occurred in one of the plurality of data management systems changing a local security rule to permit a user to access a first resource that the user was restricted from accessing, modifying one or more of the plurality of universal security rules to reflect the change to the local security rule, wherein the change to the one or more universal security rules permits the user to access the first resource that the user was restricted from accessing prior to the change to the local security rule;

following modification of the one or more universal security rules to permit the user to access the first resource, identifying a second resource, wherein a user having access to the first resource is restricted from accessing the second resource;

modifying at least one of the plurality of universal security rules to restrict the user from accessing the second resource based at least in part on the modification of the one or more universal security rules permitting the user to access the first resource; and for each of the plurality of data management systems:
translating the modified one or more universal security rules permitting the user to access the first resource and the modified at least one universal security rule restricting the user from accessing the second resource into modified local security rules; and transmitting the modified local security rules to the data management system, wherein the security component of the data management system enforces the modified local security rules in the data management system.

2. The method of claim 1, wherein the local security rules transmitted to a first data management system are different from the local security rules transmitted to a second data management system, the first and second data management systems being among the plurality of data management systems.

3. The method of claim 1, wherein a universal security rule describes access rights of entities to a group of resources, the group of resources comprising resources of different types.

4. The method of claim 3, wherein an entity comprises a user of data management systems or a group of users of data management systems, and wherein the type of a resource in the group comprises at least one selected from a group consisting of: file, matter, client, and device.

5. The method of claim 4, wherein a device comprises a computing device with network capability.

6. The method of claim 3, wherein the universal security rule restricts a first group of entities from accessing a first group of resources and restricts a second group of entities from accessing a second group of resources.

7. The method of claim 3, wherein a second universal security rule describes access rights of entities to a resource.

8. The method of claim 1, further comprising:
providing a user interface displaying the universal security rules, wherein the user interface enables a user to create, modify, and delete the universal security rules, and wherein the user interface comprises at least one selected from a group consisting of: information about universal security rules related to an entity, identification information of entities related to a universal security rule, notifications, and logging information.

9. The method of claim 1, further comprising:
receiving a local security rule from one of the plurality of data management systems; and
translating the received local security rule into a universal security rule based on the received information, the universal security rule being equivalent to the local security rule.

10. The method of claim 1, wherein one of the plurality of data management systems enforces the associated local security rules in a plurality of subsidiary systems.

11. A method for enforcing a universal security policy across a plurality of data management systems, the universal security policy describing access rights of entities to resources, each of the plurality of data management systems having a security component for enforcing local security rules consistent with the universal security policy in the associated data management system, comprising:

receiving information about the security components of the plurality of data management systems;

for each of the plurality of data management systems:
translating the universal security policy into local security rules based on the received information, the local security rules being compatible with the security component of the data management system and consistent with the universal security policy, and transmitting the local security rules to the data management system, wherein the security component of the data management system enforces the local security rules in the data management system to restrict users from accessing resources available in the data management system;

identifying a modification of local security rules of a data management system of the plurality of data management systems, the modification permitting a user to access a first resource;

determining, by a computer, whether the modified local security rules are consistent with the universal security policy;

responsive to determining that the modified local security rules are inconsistent with the universal security policy, undoing the identified modification; and responsive to determining that the modified local security rules are consistent with the universal security policy:
modifying the universal security policy based on the modified local security rules, wherein the modification to the universal security policy permits the user to access the first resource;

following modification of the universal security policy to permit the user to access the first resource, identifying a second resource, wherein a user having access to the first resource is restricted from accessing the second resource;

modifying the universal security policy to restrict the user from accessing the second resource based at least in part on the modification of the universal security policy permitting the user to access the first resource; and for each of the plurality of data management systems:
translating the modified universal security policy into local security rules permitting the user to access the first resource and restricting the user from accessing the second resource; and transmitting the modified local security rules to the data management system, wherein the security component of the data management system enforces the modified local security rules in the data management system.

12. The method of claim 11, wherein undoing the identified modification further comprises:
identifying an entity or entities relevant to the identified modification; and
notifying the identified entity or entities of the undoing of the identified modification.

13. The method of claim 11, wherein undoing the identified modification further comprises:
responsive to determining that the modified local security rules are inconsistent with the universal security policy, replacing the modified local security rules with local security rules consistent with the universal security policy.

14. The method of claim 13, wherein replacing the modified local security rules further comprises replacing the modified local security rules with the corresponding local security rules without the modification.

15. The method of claim 11, wherein undoing the identified modification further comprises:
   recording the undoing of the identified modification in a log file.

16. A computer program product for use in conjunction with a computer system, the computer program product comprising a non-transitory computer readable storage medium and a computer program mechanism embedded therein for enforcing a universal security policy across a plurality of data management systems, the universal security policy comprising a plurality of universal security rules describing relationships among users and resources, each of the plurality of data management systems having a security component for enforcing local security rules in the associated data management system, the computer program mechanism comprising instructions for:
   receiving information about the security components of the plurality of data management systems;
   for each of the plurality of data management systems:
      translating at least one of the universal security rules into local security rules based on the received information, the local security rules being compatible with the security component of the data management system and consistent with the universal security policy, and
      transmitting the local security rules to the data management system, wherein the security component of the data management system enforces the local security rules in the data management system to restrict users from accessing resources available in the data management system;
   monitoring user activities and local security rule modifications occurring in the plurality of data management systems;
   responsive to a determination that an activity occurred in one of the plurality of data management systems changing a local security rule to permit a user to access a first resource that the user was restricted from accessing,
      modifying one or more of the plurality of universal security rules to reflect the change to the local security rule, wherein the change to the one or more universal security rules permits the user to access the first resource;
      following modification of the one or more universal security rules to permit the user to access the first resource, identifying a second resource, wherein a user having access to the first resource is restricted from accessing the second resource;
      modifying at least one of the plurality of universal security rules to restrict the user from accessing the second resource based at least in part on the modification of the one or more universal security rules permitting the user to access the first resource; and
      for each of the plurality of data management systems:
         translating the modified one or more universal security rules permitting the user to access the first resource and the modified at least one universal security rule restricting the user from accessing the second resource into modified local security rules; and
         transmitting the modified local security rules to the data management system, wherein the security component of the data management system enforces the modified local security rules in the data management system.

17. A method for enforcing a universal security policy across a plurality of data management systems, the universal security policy comprising a plurality of universal security rules describing relationships among users and resources, each of the plurality of data management systems having a security component for enforcing local security rules in the associated data management system, comprising:
   receiving information about the security components of the plurality of data management systems;
   for each of the plurality of data management systems:
      translating at least one of the universal security rules into local security rules based on the received information, the local security rules being compatible with the security component of the data management system and consistent with the universal security policy, and
      transmitting the local security rules to the data management system, wherein the security component of the data management system enforces the local security rules in the data management system to restrict users from accessing resources available in the data management system;
   monitoring user activities and local security rule modifications occurring in the plurality of data management systems;
   responsive to a determination that a modified local security rule is inconsistent with the universal security policy, restoring the modified local security rule to a prior state; and
   responsive to a determination that an activity occurred in one of the plurality of data management systems changing a local security rule to permit a user to access a first resource that the user was restricted from accessing:
      modifying one or more of the plurality of universal security rules to reflect the change to the local security rule, wherein the change to the one or more universal security rules permits the user to access the first resource;
      following modification of the one or more universal security rules to permit the user to access the first resource, identifying second resource, wherein a user having access to the first resource is restricted from accessing the second resource;
      modifying at least one of the plurality of universal security rules to restrict the user from accessing the second resource based at least in part on the modification of the one or more universal security rules permitting the user to access the first resource; and
      for each of the plurality of data management systems:
         translating the modified one or more universal security rules permitting the user to access the first resource and the modified at least one universal security rule restricting the user from accessing the second resource into modified local security rules; and
         transmitting the modified local security rules to the data management system, wherein the security component of the data management system enforces the modified local security rules in the data management system.

18. A non-transitory computer-readable storage medium storing executable computer program instructions for enforcing a universal security policy across a plurality of data management systems, the universal security policy comprising a plurality of universal security rules describing relationships among users and resources, each of the plurality of data management systems having a security component for enforcing local security rules in the associated data management system, the executable computer program instructions comprising:

instructions for receiving information about the security components of the plurality of data management systems;

instructions for translating, for each of the plurality of data management systems, at least one of the universal security rules into local security rules based on the received information, the local security rules being compatible with the security component of the data management system and consistent with the universal security policy, and transmitting the local security rules to the data management system, wherein the security component of the data management system enforces the local security rules in the data management system to restrict users from accessing resources available in the data management system;

instructions for monitoring user activities and local security rule modifications occurring in the plurality of data management systems;

instructions for restoring, responsive to a determination that a modified local security rule is inconsistent with the universal security policy, the modified local security rule to a prior state; and instructions for, responsive to a determination that an activity occurred in one of the plurality of data management systems changing a local security rule to permit a user to access a first resource that the user was restricted from accessing:

modifying one or more of the plurality of universal security rules to reflect the change to the local security rule, wherein the change to the one or more universal security rules permits the user to access the first resource;

following modification of the one or more universal security rules to permit the user to access the first resource, identifying a second resource, wherein a user having access to the first resource is restricted from accessing the second resource;

modifying at least one of the plurality of universal security rules to restrict the user from accessing the second resource based at least in part on the modification of the one or more universal security rules permitting the user to access the first resource; and for each of the plurality of data management systems:
translating the modified one or more universal security rules permitting the user to access the first resource and the modified at least one universal security rule restricting the user from accessing the second resource into modified local security rules; and transmitting the modified local security rules to the data management system, wherein the security component of the data management system enforces the modified local security rules in the data management system.

* * * * *